United States Patent
Massicotte

(10) Patent No.: US 10,445,214 B2
(45) Date of Patent: *Oct. 15, 2019

(54) SYSTEM AND METHOD FOR TRACKING CALLBACK FUNCTIONS FOR ERROR IDENTIFICATION

(71) Applicant: Twitter, Inc., San Francisco, CA (US)

(72) Inventor: Matthew Massicotte, Quincy, MA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,594

(22) Filed: Jan. 9, 2017

(65) Prior Publication Data

US 2017/0286263 A1    Oct. 5, 2017

Related U.S. Application Data

(63) Continuation of application No. 14/210,632, filed on Mar. 14, 2014, now Pat. No. 9,542,300.

(60) Provisional application No. 61/790,975, filed on Mar. 15, 2013.

(51) Int. Cl.
*G06F 11/36* (2006.01)
*G06F 11/34* (2006.01)

(52) U.S. Cl.
CPC ...... *G06F 11/3636* (2013.01); *G06F 11/3466* (2013.01); *G06F 11/362* (2013.01); *G06F 11/366* (2013.01)

(58) Field of Classification Search
CPC ............ G06F 11/362; G06F 11/3636
See application file for complete search history.

(56) References Cited

U.S. PATENT DOCUMENTS

| 7,702,959 | B2 | 4/2010 | Hwang |
| 7,934,202 | B2 | 4/2011 | Messmer |
| 8,726,240 | B2 | 5/2014 | Gallagher |
| 8,782,644 | B2* | 7/2014 | Goetz ............... G06F 9/46 718/100 |
| 9,092,564 | B2 | 7/2015 | Wischik |
| 2008/0148284 | A1* | 6/2008 | Epstein ............ G06F 9/45529 719/316 |
| 2010/0180261 | A1 | 7/2010 | Lin |
| 2011/0264960 | A1 | 10/2011 | Cho |
| 2013/0152050 | A1 | 6/2013 | Chang et al. |
| 2013/0283242 | A1 | 10/2013 | Gounares |
| 2014/0215444 | A1 | 7/2014 | Voccio |
| 2014/0237454 | A1 | 8/2014 | Delporte |

OTHER PUBLICATIONS

DWARF Debugging Information Format, UNIX International Programming Languages SIG, Revision 2.0.0 (Jul. 27, 1993) 108 pages.

* cited by examiner

*Primary Examiner* — Joseph R Kudirka
(74) *Attorney, Agent, or Firm* — Cesari and McKenna, LLP

(57) ABSTRACT

A system and method for tracking callback functions for error identification is provided. Prior to a function calling a callback function, it records information relating to the back trace of function(s) that called the callback in a set of state information. In the event of an error condition, the state information may be examined to provide additional information for debugging purposes.

20 Claims, 7 Drawing Sheets

SYSTEM AND METHOD FOR TRACKING CALLBACK FUNCTIONS FOR ERROR IDENTIFICATION

CROSS-REFERENCE TO RELATED APPLICATIONS

This application is a continuation of U.S. patent application Ser. No. 14/210,632, filed on Mar. 14, 2014 and entitled "System and Method For Tracking Callback Functions For Error Identification." and claims priority under 35 U.S.C. § 119(e) to U.S. provisional Patent Application Ser. No. 61/790,975, filed on Mar. 15, 2013 and entitled "System and Method For Tracking Callback Functions For Error Identification." U.S. Provisional Patent Application Ser. No. 61/790,975 is incorporated herein by reference in its entirety.

BACKGROUND OF THE INVENTION

Debugging is a process of finding and extracting bugs, error and/or defects (hereinafter generally "bugs"), in a computer program, such as an application, thus making the application behave as expected by the application developer. Conventionally, developers have been primarily limited to debugging applications prior to those applications being distributed to end users for installation on an end user's mobile device, e.g., a smart phone, personal digital assistant (PDA), tablet computer, etc. With the growth of applications that may be provided to end users across the world (e.g., mobile applications), developers have limited ways of receiving information as to what may cause specific bugs in the applications, while the application is being utilized by the end user and executed on an end user's device.

One technique for collecting information relating to the state is to incorporate a set of analytics software into an application prior to it being released for use by end users. One such technique is described in U.S. patent application Ser. No. 13/323,166, entitled SYSTEM AND METHOD FOR DATA COLLECTION AND ANALYSIS OF INFORMATION RELATING TO MOBILE APPLICATIONS, by Wayne Chang et al., the contents of which are hereby incorporated by reference. However, even in known debugging systems that operate on applications designed for mobile use, state information relating to the state of the application and mobile devices the time of an error may not be properly obtained.

One common cause for improper state information being obtained is situations where an application has registered callback operation. As will be appreciated by those skilled in the art, a callback operation is a portion of executable software that is invoked at a later point in time after it has been set by a particular function. This later point in time may be after the calling function has returned program control to another function. For example the main( ) function of an application may invoke a function entitled doWork( ) which in turn, invokes the processEvent( ) callback function. If an error condition occurs during execution of the processEvent( ) callback, it is possible that information relating to the doWork( ) function may not be retained. This may occur because, for example, the doWork( ) function has returned and primary program control is within the main( ) function or some other function. In such a situation, conventional state information that may be retrieved by debugging software would typically include information relating to the processeEvent( ) function and the main( ) function or other function executing at the time of the error condition. However, there would typically be no information relating to the doWork( ) function. As such, a programmer may not focus on the doWork( ) function, even though it may be a likely cause of the error condition.

SUMMARY OF THE INVENTION

The disadvantages of the prior art are overcome by a system and method for tracking callback functions for error detection in a mobile device. During operation, information about the complete stack trace, i.e., both the callback function and the functions that initially registered the callback function is recorded in a stack. In the event of an error condition, the contents of the stack will be recorded, thereby providing information regarding the function(s) that initially registered the callback function.

In an alternative embodiment of the present invention, an address (or other identifier) of the function that calls the callback function is recorded. In the event of an error condition, it is possible to identify the function that invoked the callback function, which provides a starting point for debugging operations.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A computer network is a geographically distributed collection of entities interconnected by communication links and segments for transporting data between end nodes, such as personal computers and workstations. Many types of networks are available, with the types ranging from Wi-Fi networks, cell phone networks, local area networks (LANs) to wide area networks (WANs). Wi-Fi is a mechanism for wirelessly connecting a plurality of electronic devices (e.g., computers, cell phones, etc.). A device enabled with Wi-Fi capabilities may connect to the Internet via a wireless network access point, as known by those skilled in the art. Cellular networks are radio network distributed over land areas called "cells", wherein each cell may be served by at least one fixed-location transceiver known as a cell site or base station. When joined together, these cells may provide radio coverage over a wide geographic area. As known by those skilled in the art, this may enable a large number of portable transceivers (e.g., mobile phones) to communicate with each other. LANs typically connect the entities over dedicated private communications links located in the same general physical location, such as a building or campus. WANs, on the other hand, typically connect geographically dispersed entities over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between entities on various networks. The entities typically communicate over the network by exchanging discrete frames or packets of data according to predefined protocols, such as the Transmission Control Protocol/Internet Protocol (TCP/IP), Hypertext Transfer Protocol (HTTP). In this context, a protocol consists of a set of rules defining how the entities interact with each other and how packets and messages are exchanged.

Figure 1:
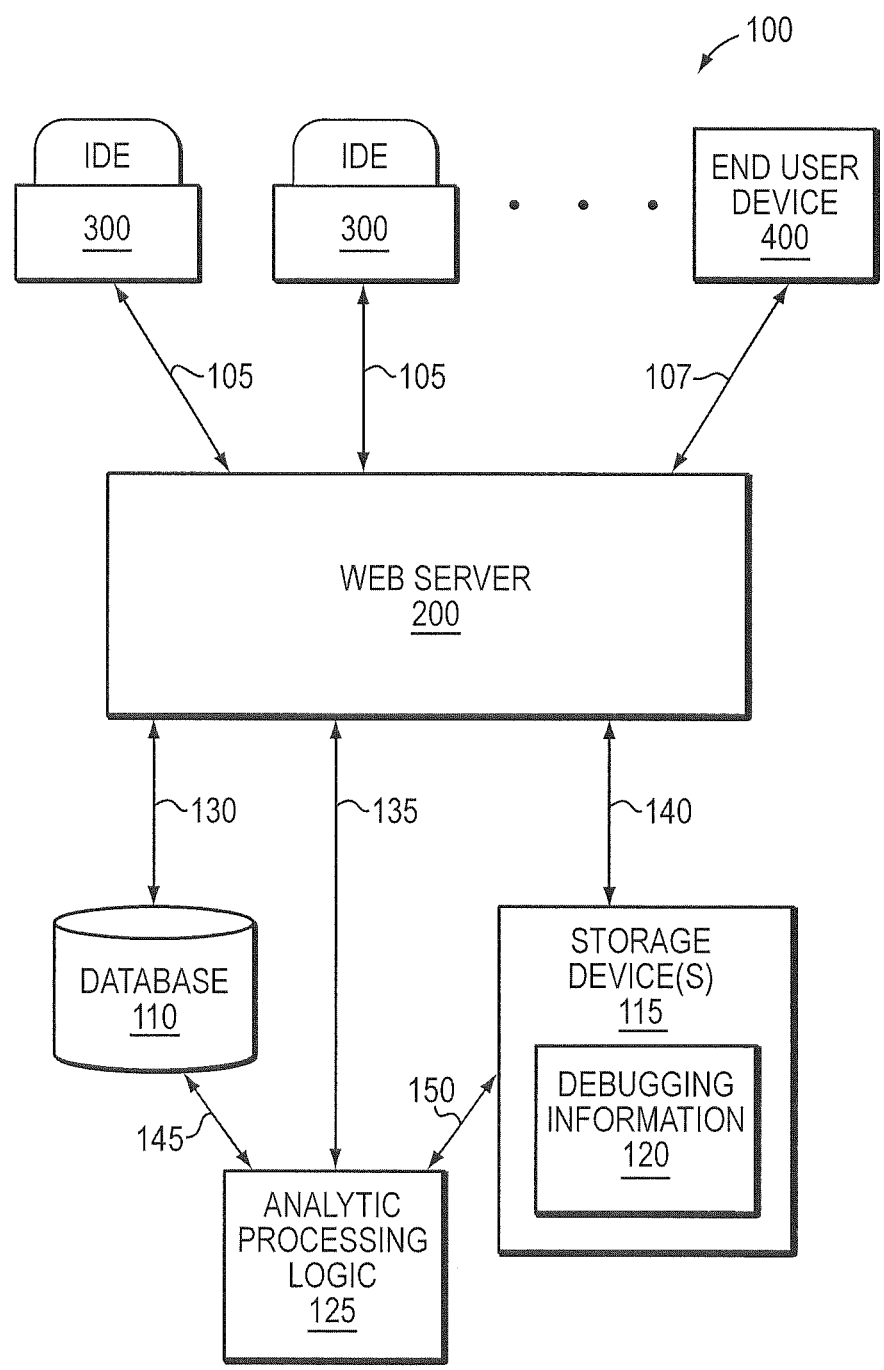
FIG. 1 is a schematic block diagram of an exemplary computing environment in accordance with an illustrative embodiment of the present invention.

FIG. 1 is a schematic block diagram of an exemplary computing environment 100 in accordance with an illustrative embodiment of the present invention. Specifically, the computing environment 100 may include one or more integrated development environments (IDE) 300 coupled to one or more web servers 200 (managed by an analytic service provider), interconnected by one or more communication links 105. Developer IDE 300, described further below in reference to FIG. 3, represent development environments utilized by application developers for creation of source code to be compiled, or otherwise built, to generate applications to be distributed for execution on end user device 400. Illustratively, IDE 300 may implement an Xcode development environment. As known by those skilled in the art, Xcode is a suite of tools for developing software on a Macintosh (MAC) Operating System X (OS), developed by Apple Inc. While the present invention is described in relation to IDE 300 utilizing Xcode, it should be noted that the teaching of the present invention may be utilized with any development environment. As such, all references to Xcode and/or Mac OS should be taken as exemplary only. Web server 200, described further below in reference to FIG. 2, is illustratively utilized to enable distribution of the analytic software to IDE 300, collection of data from IDE 300 and end user device 400, as well as provides proper message passing among the various entities in environment 100.

Further, end user device 400, database 110, analytic processing logic 125, and storage device(s) 115 may be coupled to web servers 200 via communication link(s) 107, 130, 135, 140, 145, and 150, respectively. Storage device(s) 115 may for example store debugging information (e.g., dSYM file), among other data associated with the IDE 300 and end user device 400. End user device 400, described further below in reference to FIG. 4, may comprise any device capable of executing applications. Illustratively, end user device 400 may comprise a smart phone, a personal digital assistant and/or a tablet computer. Exemplary smart phones may utilize the Android operating system, available from Google, Inc., and/or the iOS system, available from Apple, Inc. It should be noted that other smart phones may be utilized in alternative embodiments. As such, the description herein directed to development for iOS systems should be taken as exemplary only.

It is noted that links 105, 107, 130, 135, 140, 145, and 150 are depicted in FIG. 1 as separate and individual links for simplicity purposes, and that communications between the devices may occur over a single link (e.g., Internet), a plurality of links, or virtual links as know by those skilled in the art. Moreover, one or more web servers 200, database 110, analytic processing logic 125, and storage device(s) 115 may all reside on a single device, or a plurality of devices, and managed by the analytic service provider. The devices are shown as separate entities in FIG. 1 for simplicity purposes. Further, those skilled in the art will understand that any number of devices and/or links may be used in the computer environment, and that the view shown herein is for simplicity.

Figure 2:
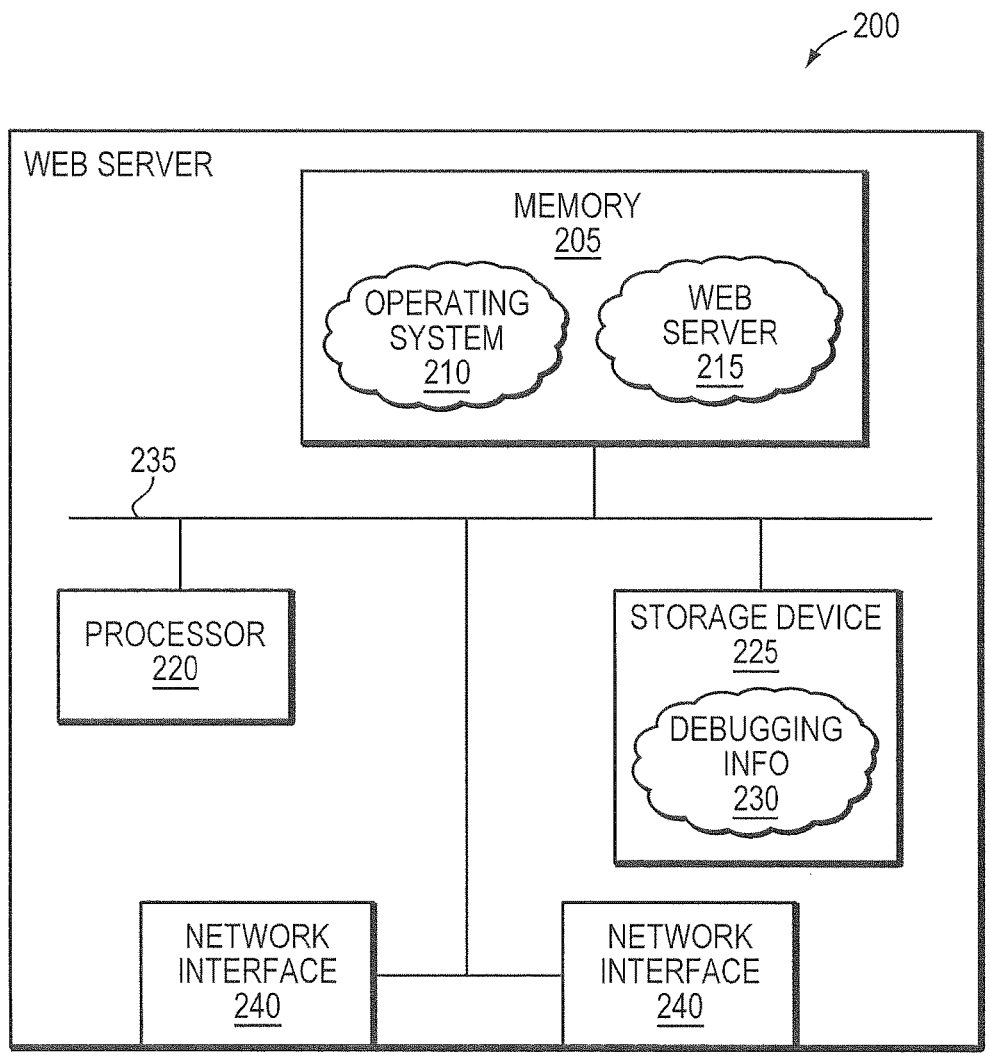
FIG. 2 is a schematic block diagram of an exemplary web server in accordance with an illustrative embodiment of the present invention.
Figure 3:
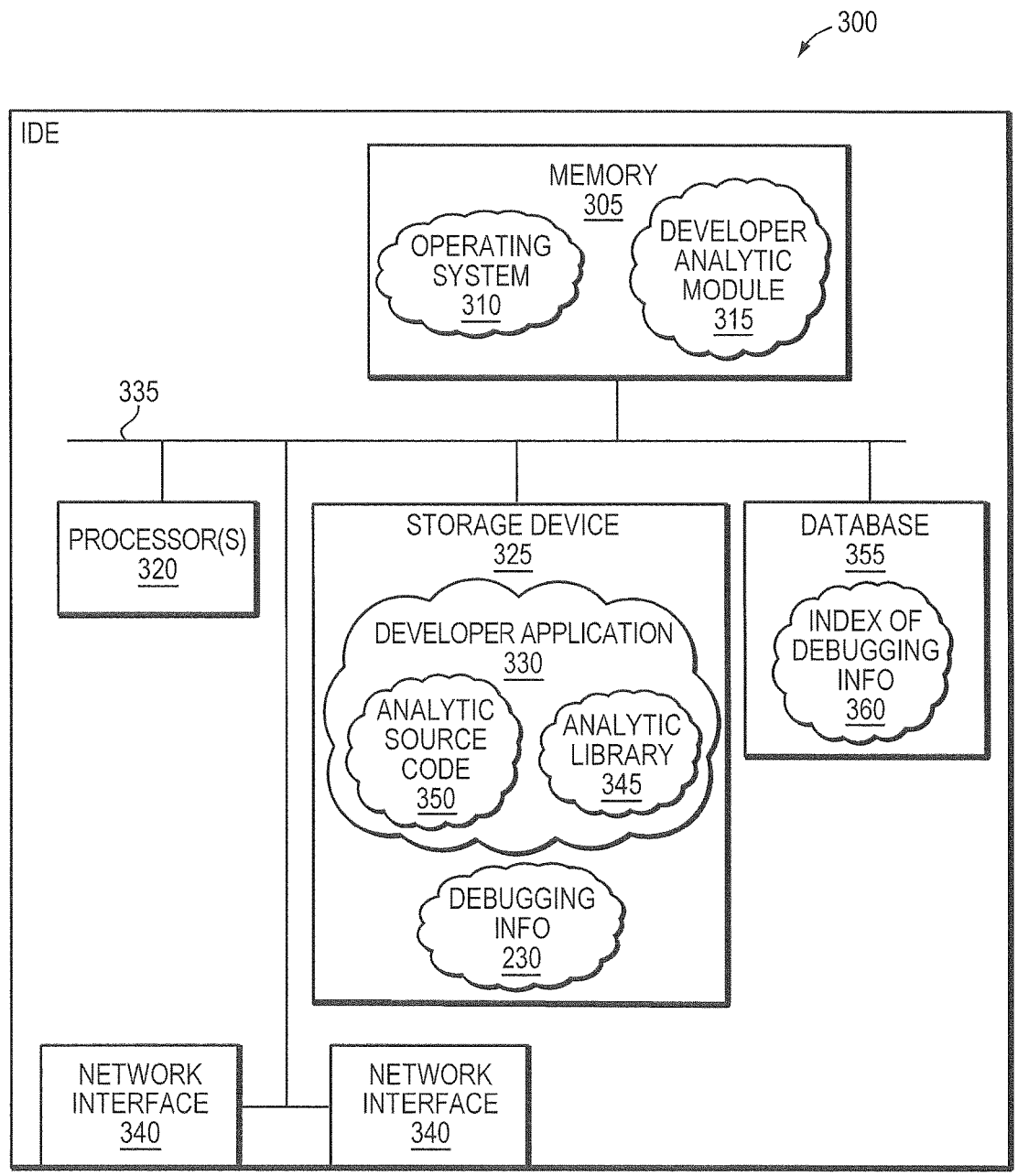
FIG. 3 is a schematic block diagram of an exemplary IDE in accordance with an illustrative embodiment of the present invention.

FIG. 2 is a schematic block diagram of an exemplary web server 200 in accordance with an illustrative embodiment of the present invention. The web server 200 may comprise a plurality of network interfaces 240, one or more processors 220, storage device 225, and a memory 205 interconnected by a system bus 235. The network interfaces 240 contain the mechanical, electrical, and signaling circuitry for communicating data over physical links coupled to a network, such as links 105, 107, 130, 135, 145, and 140. The network interfaces may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, known to those skilled in the art.

The memory 205 comprises a plurality of locations that are addressable by the processor(s) 220 and the network interfaces 240 for storing software programs and data structures associated with the embodiments described herein. The processor 240 may comprise necessary elements or logic adapted to execute the software programs and manipulate the data structures. An operating system 210, portions of which are typically resident in memory 205 and executed by the processor(s), functionally organizes the web server 200 by, inter alia, invoking network operations in support of software processes and/or services executing on the web server. A web server 215, portions of which are typically resident in memory 205 are executed by the processor(s), functionally store and execute logical commands inputted by the analytic service provider and developers. For example, web server 215 may implement a website managed by the analytic service provider, wherein developer may access that web site to obtain pertinent information associated with their applications and information associated with bugs incurred on the developer's application executing on an end user device. It should be noted that any system for distribution of the analytic software, collection of debugging information and crash data, etc. may be utilized. As such, the description of a web server should be taken as exemplary only. In alternative embodiments, the various functionalities may be distributed among a plurality of servers. As such, the description of a single web server 200 should be taken as exemplary only.

A storage device 225 may store debugging information 230, such as a dSYM file, that is sent, for example automatically, over the communication links from an IDE. Those skilled in the art will understand that a dSYM file may contain a plurality of mappings between memory offsets, such as addresses, and method names and line numbers associated with the built/compiled application created by the developer. The structure and information relating to a dSYM file and the functions associated therewith are well-known and described in more detail in "DWARF Debugging Information Format," dated Jul. 27, 1993, the contents of which are hereby incorporated by reference. It should be noted that in alternative embodiments, debugging information may be stored in differing formats other than dSYMs. For example, when developing for an Android based end user device, debugging information may be stored in a well-known de-obsfuscation (de-ob) data container (file) such as that generated by the Proguard software that is available under the GPL. As such, the description of using dSYM files should be taken to be exemplary only. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

FIG. 3 is a schematic block diagram of an exemplary IDE 300 in accordance with an illustrative embodiment of the present invention. The IDE may comprise a plurality of network interfaces 340, one or more processors 320, a memory 305, a storage device 325, and database 355 interconnected by a system bus 335. The network interfaces 340 contain the mechanical, electrical, and signaling circuitry for communicating data over physical links coupled to a network, such as links 105, 107, 130, 135, 140, 145, and 150. The network interfaces may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 340 may also be used to implement one or more virtual network interfaces, such as for Virtual Private Network (VPN) access, known to those skilled in the art.

The memory 305 comprises a plurality of locations that are addressable by the processor(s) 320 and the network interfaces 340 for storing software programs and data structures associated with the embodiments described herein. The processor 340 may comprise necessary elements or logic adapted to execute the software programs and manipulate the data structures. An operating system 310, portions of which are typically resident in memory 305 and executed by the processor(s), functionally organizes the IDE by, inter alia, invoking network operations in support of software processes and/or services executing on the web server.

A developer analytic module 315, that is associated with the analytic service provider, portions of which are typically resident in memory 305 are executed by the processor(s), may functionally be installed onto IDE 300 by a user, such as a developer. The analytic module 315 may, for example, assist in gathering debugging information 230 associated with the developer's application on IDE 300. In accordance with various embodiments of the present invention, the developer analytic module 315 may perform various functions to aid in the development of applications by aiding the integration of the IDE with the analytic service provider. These various functions, described further below, help to ensure that the IDE is utilizing the most up to date SDK and to ensure that any necessary files, e.g., dSYMs are transferred to the web server, etc.

A storage device 325 may store debugging information 230, such as a dSYM file, that is associated with application 330 of the developer. Further, storage device 325 may also store the application 330 of the developer that may be written and compiled on IDE 300 by a developer, for example. An analytic library 345 and analytic source code 350, that are associated with an analytic service provider, may be installed/incorporated within application 330 of the developer.

Database 355, is illustratively configured to store an index of the debugging information 360 that may be gathered by developer analytic module 315. For example, database 355 may store an index of a URL of a dSYM file by an identifier, e.g., a universally unique identifier (UUID), associated with the debugging information 230. In an illustrative embodiment, database 355 may be implemented using the well-known SQLite database, however, it should be noted that in alternative embodiments any type of data structure that permits indexing, including, e.g., hash tables, etc., may be used. As such, the description of a database should be taken as exemplary only. Also, while the embodiments herein are described in terms of processes or services stored in memory, alternative embodiments also include the processes described herein being embodied as modules consisting of hardware, software, firmware, or combinations thereof.

Figure 4:
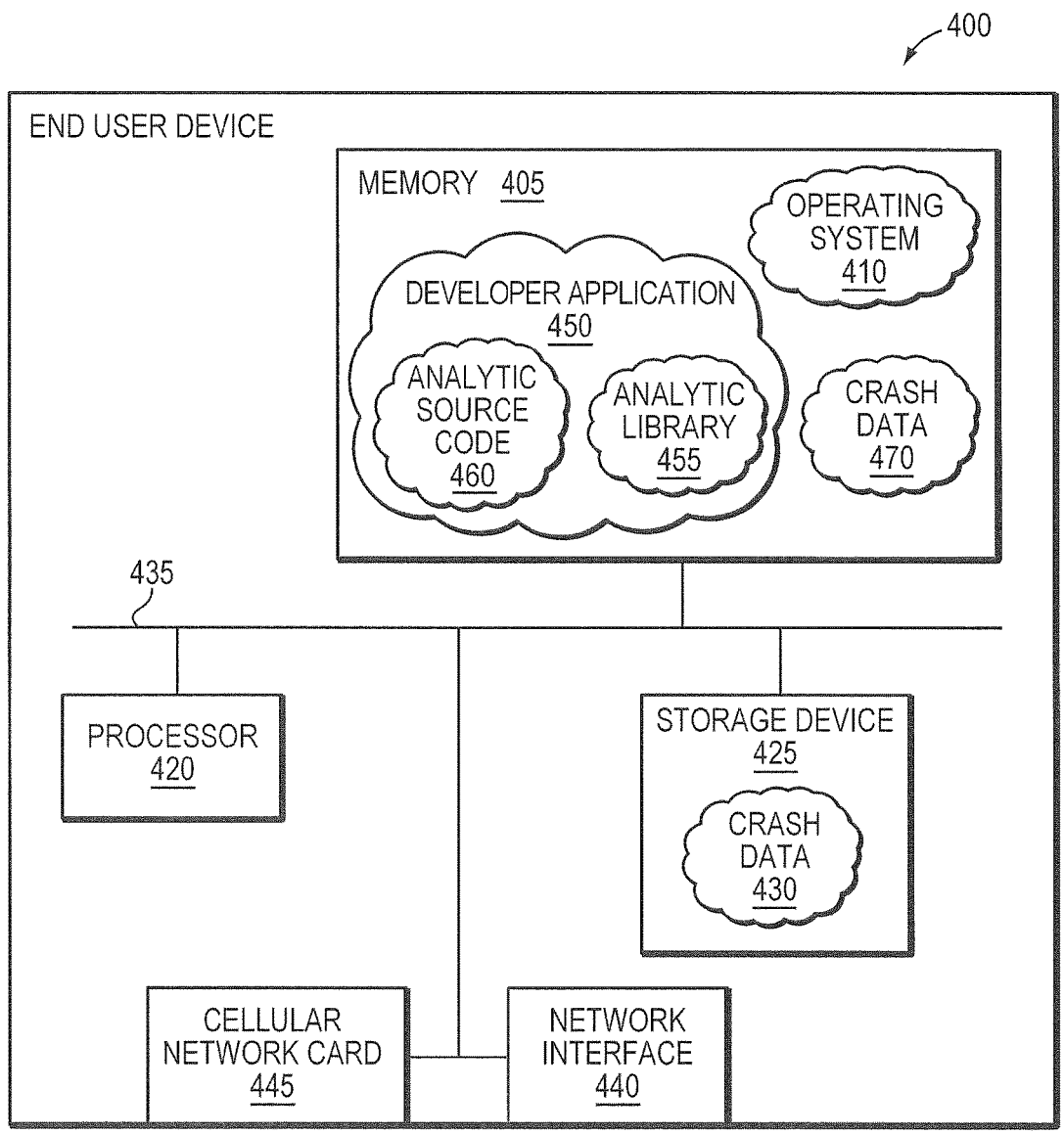
FIG. 4 is a schematic block diagram of an exemplary end user device in accordance with an illustrative embodiment of the present invention.

FIG. 4 is a schematic block diagram of an exemplary end user device 400 in accordance with an illustrative embodiment of the present invention. End user device 400 may comprise any device capable of executing applications. Illustratively, end user devices 400 may comprise a smart phone, a personal digital assistant and/or a tablet computer. Exemplary smart phones may utilize the Android operation system, available from Google, Inc., and/or the iOS system, available from Apple, Inc. It should be noted that other smart phones may be utilized in alternative embodiments. As such, the description herein directed to the development for iOS systems should be taken as exemplary only. The end user device may comprise network interfaces 440, one or more processors 420, a memory 405, a storage device 425, and a cellular network card 445 interconnected by a system bus 435. The network interfaces 440 and cellular network 445 contain the mechanical, electrical, and signaling circuitry for communicating data over physical links coupled to a network, such as links 105, 107, 130, 135, 140, 145, and 150. The network interface 440 and cellular network card 445 may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 440 may also be used to implement one or more virtual network interfaces, such as for Virtual Private Network (VPN) access, known to those skilled in the art.

The memory 405 comprises a plurality of locations that are addressable by the processor(s) 420 and the network interfaces 440 for storing software programs and data structures associated with the embodiments described herein. The processor 420 may comprise necessary elements or logic adapted to execute the software programs and manipulate the data structures. An operating system 410, portions of which are typically resident in memory 405 and executed by the processor(s), functionally organizes the end user device by, inter alia, invoking network operations in support of software processes and/or services executing on the web server. An application 450, that may have been created by a developer on an IDE, and portions of which are typically resident in memory 405, are executed by the processor(s). Application 450 may be downloaded or installed on end user device 400 in any manner known to those skilled in the art. Further, application 450 includes analytic library 455 and analytic source code 460 that may have been incorporated within application 450 on IDE 300 by the developer. When the application 450 encounters a bug, crash data 470 associated with the bug and application (e.g., running processes, current RAM usage, IP address and network settings, physical orientation of the device in 3D space, among other aspects) may be created.

The in-memory crash data 470 may comprise, e.g., stack trace information containing callback information in accordance with an illustrative embodiment of the present invention. In one illustrative embodiment of the present invention, when a function calls a callback function, the address (or other identifier of the calling function) is recorded in the in-memory crash data 470. In the event of an error condition, the address of the calling function is available for debugging operations. In another illustrative embodiment of the present invention, the calling function records the entire back trace of the callback function. In the example, given above, this would record the main( ), doWork( ) and processEvent( ) functions in the in-memory crash data 470. The back trace information may be obtained by using, e.g., the Thread.currentThread( ).getStackTrace( ) functionality in Java or similar functions in other programming languages. In this illustrative embodiment, in the event of an error condition, the entire back trace information is available for debugging purposes. Exemplary function stacks 800, 900 are described below in reference to FIGS. 8 and 9.

It should be noted that the illustration given herein comprises of three functions (main( ), doWork( ) and processEvent( )). As will be appreciated by those skilled in the art, any number of functions may be utilized with varying names. As such, the names functions described herein should be taken as exemplary only. Generally, the processEvent( ) function represents a callback function. The doWork( ) function represents a function that calls a callback function. The main( ) function represents the conventional main process control of an application. As will be appreciated by those skilled in the art, any number of functions may be interspersed between the exemplary main( ) function and the doWork( ) function. The illustration of main( ) directly calling doWork( ) should be taken as exemplary only for ease of description herein.

The in memory crash data 470 may be stored on storage device 425 as stored crash data 430. Such storage devices may be non-volatile random access memory, flash, micro HD, etc. Also, while the embodiments herein are described in terms of processes or services stored in memory, alternative embodiments also include the processes described herein being embodied as modules consisting of hardware, software, firmware, or combinations thereof.

Figure 5:
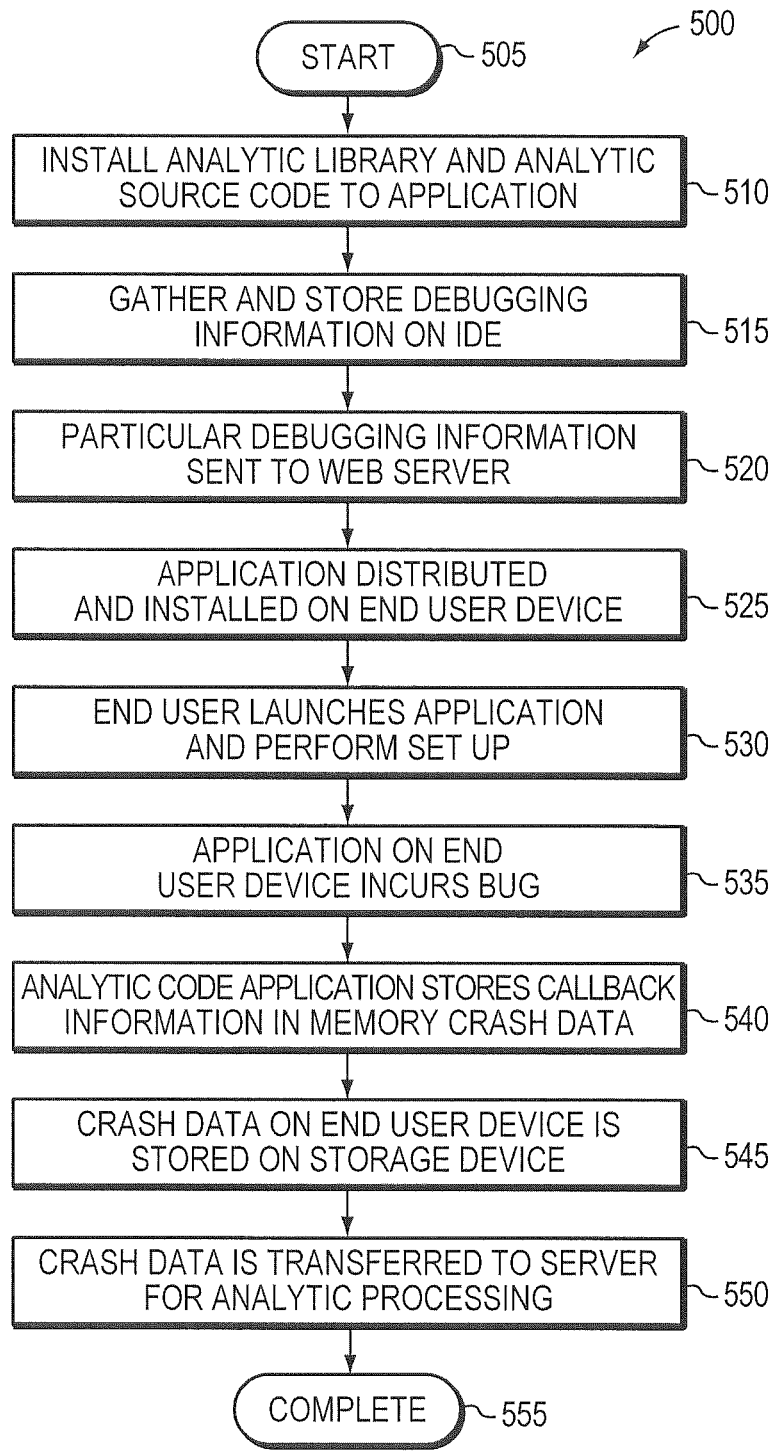
FIG. 5 is a flowchart detailing the steps of an exemplary procedure for tracking callback functions for error identification in accordance with an illustrative embodiment of the present invention.

FIG. 5 is a flowchart detailing the steps of an exemplary procedure 500 for tracking callback functions for error detection in accordance with an illustrative embodiment of the present invention. The procedure 500 starts at step 505 and continues to step 510 where analytic source code and/or an analytic library is installed within the application on an IDE. In step 515, debugging information (e.g., version number, icon, dSYM file) may be locally stored on the IDE. In step 520, particular debugging information, such as a dSYM file, may be automatically sent over a network, to web server 200, and stored at storage device 115. As explained above, the dSYM is capable of being automatically uploaded or sent to web server 200 due to the installation of the analytic source code an/or analytic library. Specifically, the integration of the analytic source code and/or analytic library may automatically detect when a new dSYM is generated on the IDE, de-duplicate the dSYM based on an identifier, and automatically upload or send the dSYM to the web server. A plurality of different types of messages may be utilized to transmit the particular debugging information from the IDE to the storage device, and other entities as described above in reference to FIG. 1. The particular debugging information is typically generated when the application developer compiles a new version of the application, i.e., a new "build" of the application. For example, and as known by those skilled in the art, a developer may select a particular command, such as a "DWARF with dSYM file", as a Debug Information Format in the build settings of an application (e.g., Xcode). A dSYM may then be generated automatically when the application is compiled. A noted advantage of the developer analytic module is that it is configured to monitor the location where such a dSYM file is stored within the storage space of the developer. As such, the dSYM file may be stored anywhere within the available storage of the developer's site and still be monitored by the developer analytic module. Further, and as described in further detail below, particular debugging information, such as an identifier, extracted from the debugging information that remains resident on the developer's system, is sent to the web server, wherein the identifier is associated with an address of the developer's system (e.g., IP address) and indexed.

In step 525, the application may be distributed and installed on end user devices, such as mobile phones or other entities. For example, the application may be downloaded on the end user device over a cellular network or any other type of network. For example, the application may be available to end users through libraries associated with particular end user devices (e.g., iTunes on an iPhone). The end user may then select the developer's application from the library and download the application on the end user device. The end user may then utilize the application on his/her end user device. In other instances, the application may simply be available on a particular website, that the user may find through conventional web based search techniques. After finding the application, the user may then download the application from the website and utilize the application on the end user device. As is known to those skilled in the art, applications may be available for installation on an end user device through various techniques, and the techniques described above are simply exemplary in nature.

In step 530, the application may be launched, by an end user for example, on the end user device. The end user may then utilize the application that includes the analytic library and/or the analytic software on the end user device. The end user may, for example, go through a series of set up steps associated with whether crash detection and reporting. For example, some user may determine that they do not want to enable crash detection and reporting for privacy reasons or other reasons. In such a case, the user of the end user device may indicate, utilizing a keypad associated with the end user device, that he/she wishes to disable crash detection and reporting on the end user device. Thereafter, for example when network connectivity is obtained (e.g., cell phone network or WIFI network), the preference indicated by the user may be transmitted to the web server. Thereafter, when the application incurs a bug, the crash data may remain on the end user device instead of sending the crash data to web server 200 for analytic processor.

In step 535, the application on the end user device encounters a bug or other error condition. For example, the application may crash unexpectedly or may behave in a manner not intended. As noted above, in accordance with various embodiments of the present invention, information relating to the function(s) that have called callback functions is recorded in state information. In response to the error condition, the callback information from the state information is stored in the in-memory crash data 470. This may occur by, e.g., the state information being copied from one area of memory to another or, in alternative embodiments, the applications may store the state information in the in-memory crash data 470 during normal operation.

Figure 6:
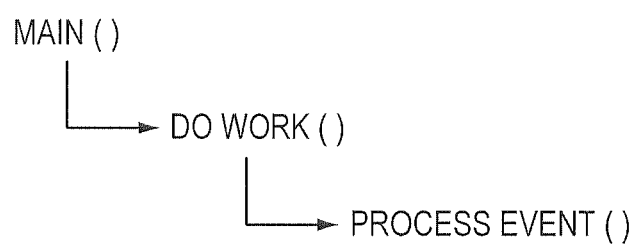
FIG. 6 is an exemplary process flow diagram in accordance with an illustrative embodiment of the present invention.
Figure 7:
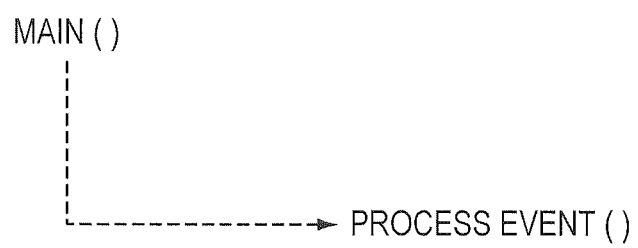
FIG. 7 is an exemplary process flow diagram in accordance with an illustrative embodiment of the present invention.

FIG. 6 is an exemplary process flow diagram in accordance with an illustrative embodiment of the present invention. It represents program flow from the main( ) function to the doWork( ) function to the processEvent( ) function. FIG. 7 is an exemplary process flow diagram in accordance with an illustrative embodiment of the present invention. The diagram illustrated in FIG. 7 represents the conventional stack information that would be recorded without the present invention, i.e., there is a representation of the main( ) and processEvent( ) functions but no recorded information relating to the doWork( ) function that called the processEvent( ) function. By using the principles of the present invention, the state information will comprise of information relating to the doWork( ) function, so that it may form a basis for the debugging process.

More generally, the present invention allows the recording of state information that may not be available in a conventional stack. As a callback function, which may comprise a closure, may be executed at a later time, conventional error reporting systems lack the ability to identify what function created/called the callback function.

Figure 8:
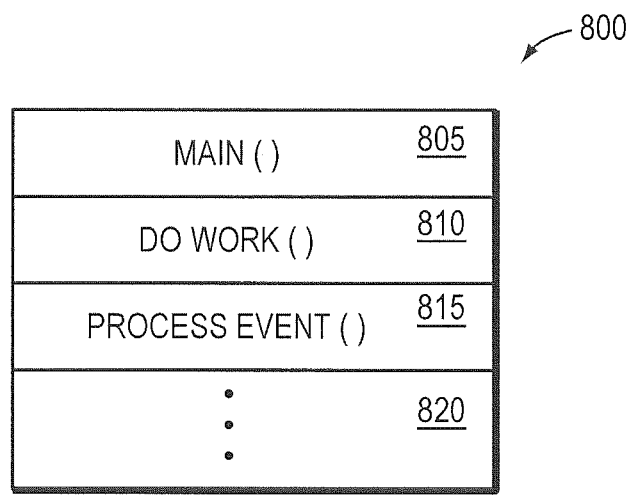
FIG. 8 is a schematic block diagram of an exemplary function stack in accordance with an illustrative embodiment of the present invention.
Figure 9:
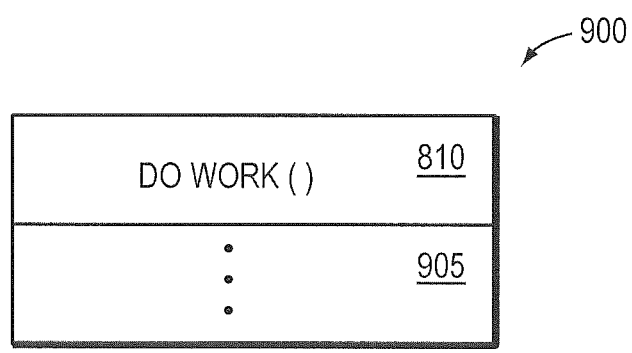
FIG. 9 is a schematic block diagram of an exemplary function stack in accordance with an illustrative embodiment of the present invention.

FIGS. 8 and 9 are exemplary function stacks in accordance with an illustrative embodiment of the present invention. Exemplary function stack 800 (FIG. 8) illustrates state information that may be stored in accordance with an illustrative embodiment of the present invention in the in-memory crash data 470. Exemplary function stack 800 comprises an identifier of the main( ) function 805, the doWork( ) function 810 and the processEvent( ) function 815 and, in alternative embodiments, additional functions 820. Thus, exemplary function stack 800 illustrates state information stored when the back trace of a callback function is stored. In contrast, exemplary function stack 900 illustrates the state information stored in an alternative embodiment of the present invention where only an identifier of the function that called the callback function is stored. In such an embodiment, an identifier of the doWork( ) function 810 is stored.

In accordance with an illustrative embodiment of the present invention, the identifier of the functions stored within function stacks 800, 900 may comprise the address of the function within the memory 405 of the end user device 400. In alternative embodiments, the identifier may comprise a numeric identifier and/or alphanumeric string that uniquely identifies the function. As such, the description of using the address of a function should be taken as exemplary only.

In step 545, crash data (e.g., running processes, current usage, network address and network settings, physical orientation of the device in 3D space, among other aspects) may be stored locally on the end user device. Illustratively, the in-memory crash data 470 is stored on the storage device 425 as stored crash data 430. Thereafter, after network connectivity is obtained, the crash data may be sent to web server 200 and stored at storage device 115 that is managed by the analytic service provider in step 550. For example, the end user device may be out of "range" (e.g., in a tunnel) if he is utilizing a device that is trying to connect to a cellular phone network. Alternatively, the end user device may be device, such a laptop or iPad, that has WIFI connection capabilities, but for whatever reason has lost its connection or is not connected to the WIFI network. The procedure 500 then ends at step 555.

One exemplary use case of the present invention may be utilized to provide context to a programming language in a runtime environment that implements closures. As used generally herein, a closure is a first class function that may access variables that are local to the scope within which the function was created. As is generally understood by those skilled in the art, a first class function is a function that may be stored as a variable and passed to other functions. In an example, assume that a function Foo( ) is written that contains a closure Closure( ). During operation, Foo( ) submits Closure( ) to a subsystem for later execution. The runtime environment of the programming language creates the closure and captures the local data, i.e., the data associated with the function Foo( ), Closure( ) is executed successfully, but then the runtime environment encounters an error condition during the clean up of the closure. Such an error condition may occur due to a problem with the clean up of the previously captured local data. Such an example causes debugging problems for a developer using conventional error reporting systems. Conventional systems will report that the runtime environment crashed while cleaning up a closure and may report that the subsystem was active while the cleanup was occurring. However, they will not report nay information about the closure including, e.g., that it was created by Foo( ). This information is critical to a developer as the closure was created by Foo( ), thus the local data would come from Foo( ). However, the present invention would provide this important information relating to context, i.e., that Foo( ) created Closure( ). This information may then be used by an application developer for debugging purposes.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A computer implemented method comprising:
   executing, by a processor, an application that includes a first function that creates a first class function that is stored as a variable and passed to one or more other functions;
   storing within program flow information an identifier of the first function that created the first class function;

executing the first class function based on invocation of the first class function by a second function that is one of the one or more other functions;

incurring an error condition associated with the first class function after invocation by the second function; and utilizing the program flow information to determine that the first function created the first class function.

2. The computer implemented method of claim 1 wherein the program flow information comprises at least one of an address of the first class function and a first class function identifier of the first class function.

3. The computer implemented method of claim 1 wherein the first class function is a closure.

4. The computer implemented method of claim 1 wherein the program flow information comprises a set of back trace information associated with the first class function.

5. The computer implemented method of claim 4 wherein the back trace information comprises a list of functions associated with a program flow that includes the first class function.

6. The computer implemented method of claim 1 further comprising:

transferring the program flow information to an analytic processing server; and analyzing the program flow information to determine a cause of the error condition.

7. A computer implemented method comprising:

executing, by a processor, an application that includes at least a first function that creates a closure;

storing within program flow information an identifier of the first function that created the closure to be submitted to at least one other function of the application for execution;

incurring an error condition associated with the closure during execution of the closure and after invocation by the at least one other function; and utilizing the program flow information to determine that the first function created the closure.

8. The computer implemented method of claim 7 wherein the program flow information comprises at least one of an address of the closure and a closure identifier of the closure.

9. The computer implemented method of claim 7 wherein the program flow information comprises a set of back trace information associated with the closure.

10. The computer implemented method of claim 9 wherein the back trace information comprises a list of functions associated with a program flow that includes the closure.

11. The computer implemented method of claim 7 further comprising:

transferring the program flow information to an analytic processing server; and analyzing the program flow information to determine a cause of the error condition.

12. A non-transitory computer readable medium comprising instructions configured to execute on one or more computer processors to enable the one or more computer processors to:

execute an application that includes a first function that creates a first class function that is stored as a variable and passed to one or more other functions;

store within program flow information an identifier of the first function that created the first class function;

execute the first class function based on invocation of the first class function by a second function that is one of the one or more other functions;

incur an error condition associated with the first class function after invocation by the second function; and utilize the program flow information to determine that the first function created the first class function.

13. The non-transitory computer readable medium of claim 12 wherein the program flow information comprises at least one of an address of the first class function and a first class function identifier of the first class function.

14. The non-transitory computer readable medium of claim 12 wherein the first class function is a closure.

15. The non-transitory computer readable medium of claim 12 wherein the program flow information comprises a set of back trace information associated with the first class function.

16. The non-transitory computer readable medium of claim 15 wherein the back trace information comprises a list of functions associated with a program flow that includes the first class function.

17. The non-transitory computer readable medium of claim 12 wherein the program instructions further enable the one or more computer processors to:

transfer the program flow information to an analytic processing server; and analyze the program flow information to determine a cause of the error condition.

18. A system comprising:

a processor of a computing device operatively interconnected with storage of the computing device, the processor configured to:

execute an application that includes a first function that creates a first class function that is stored as a variable and passed to one or more other functions;

store, within program flow information, an identifier of the first function that created the first class function;

execute the first class function based on invocation of the first class function by a second function that is one of the one or more other functions;

incur an error condition associated with the first class function after invocation by the second function; and utilize the program flow information to determine that the first function created the first class function.

19. The system of claim 18 wherein the program flow information comprises at least one of an address of the first class function and a first class function identifier of the first class function.

20. The system of claim 18 wherein the first class function is a closure.

* * * * *

UNITED STATES PATENT AND TRADEMARK OFFICE
CERTIFICATE OF CORRECTION

| | | |
|---|---|---|
| PATENT NO. | : 10,445,214 B2 | Page 1 of 1 |
| APPLICATION NO. | : 15/401594 | |
| DATED | : October 15, 2019 | |
| INVENTOR(S) | : Matthew William Massicotte | |

It is certified that error appears in the above-identified patent and that said Letters Patent is hereby corrected as shown below:

In the Specification

Column 1, Line 66:
processeEvent ( function and the main ( ) function or other
Should read:
processEvent ( function and the main ( ) function or other Signed and Sealed this
Second Day of June, 2020

Andrei Iancu
*Director of the United States Patent and Trademark Office*